Figure 1:
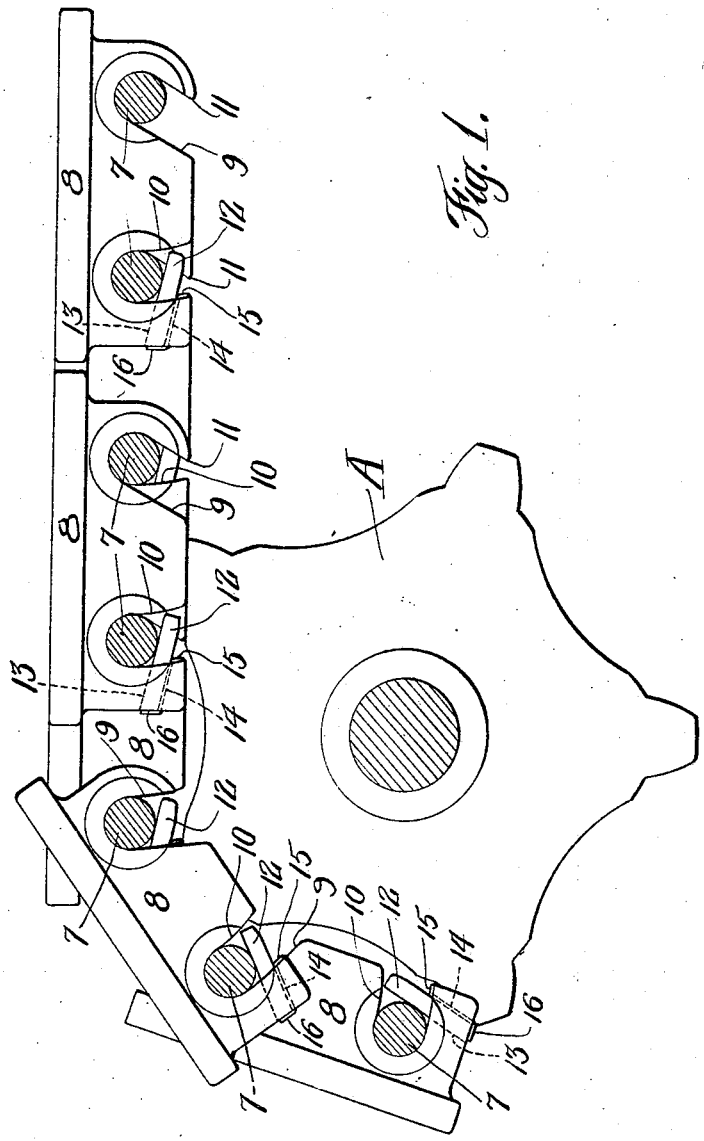

May 28, 1929.　　　J. VAN BRUNT　　　1,714,577
CHAIN GRATE
Filed Jan. 28, 1925　　　2 Sheets-Sheet 1

INVENTOR
John Van Brunt
BY Synnestvedt & Lechner
ATTORNEYS

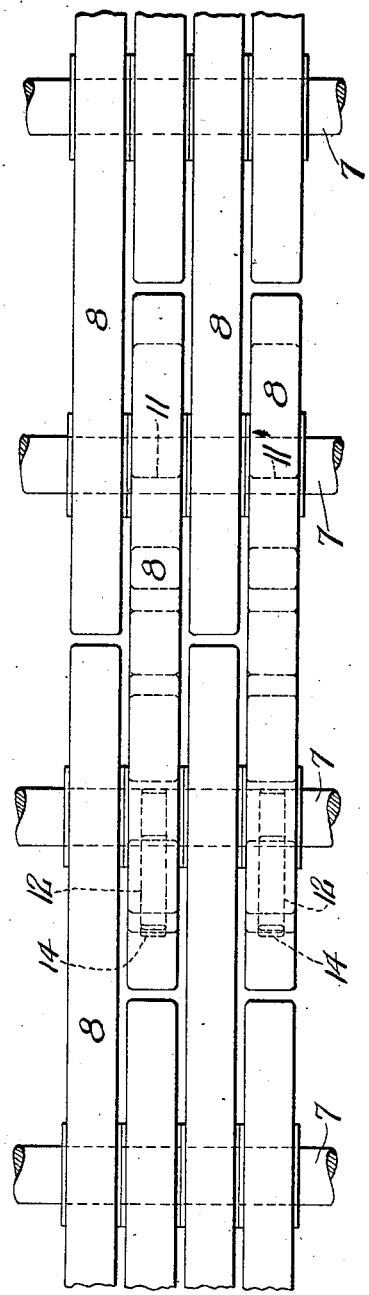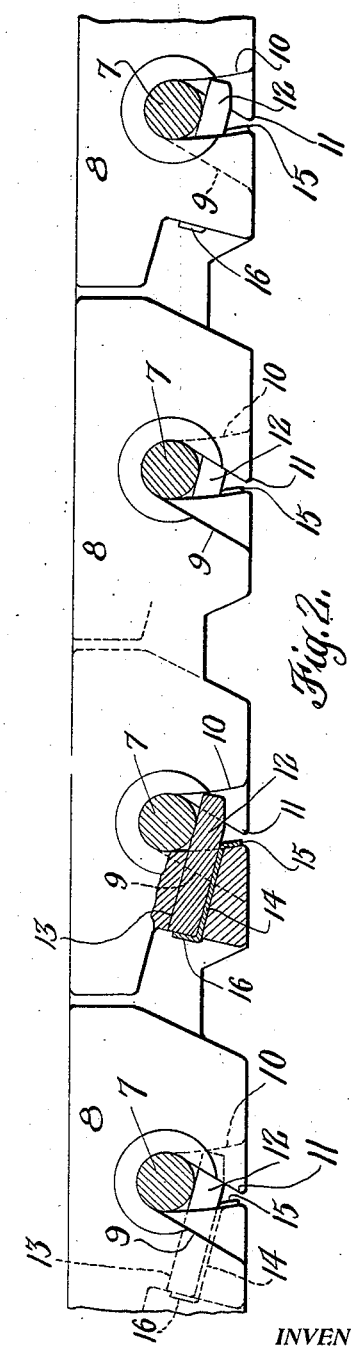

Patented May 28, 1929.

1,714,577

UNITED STATES PATENT OFFICE.

JOHN VAN BRUNT, OF FLUSHING, NEW YORK, ASSIGNOR TO COMBUSTION ENGINEERING CORPORATION, A CORPORATION OF NEW YORK.

CHAIN GRATE.

Application filed January 28, 1925. Serial No. 5,185.

This invention relates to chain grates or chain grate stokers, and one of the primary objects of the invention is to provide a grate, the links of which, while securely held in place, are nevertheless readily detachable and readily assembled.

How the foregoing, together with such other objects as may hereinafter appear, or are incident to my invention, are realized, is illustrated in the accompanying drawings, wherein Fig. 1 is a vertical section of a portion of a chain constructed in accordance with my invention;

Fig. 2 is a side elevation of a portion of a modified form of chain, with certain parts shown in section; and Fig. 3 is a plan view of the chain of Fig. 2.

Referring now to Fig. 1, it will be seen that the chain comprises a plurality of pintles 7, and links 8, the parts being assembled so as to constitute an endless chain grate, passing over a suitable driver member A and an idler member, as is customary in this art. The pintles may be driven, or, as will later appear, the chain may be driven thru the links.

Referring now to the links 8 it will be seen that they are arranged in staggered relation and are suitably spaced apart. Each link has two pintle receiving slots or notches 9 and 10. The notch 9 is inclined with respect to the grate surface of the link so that the outer edge 11 lies within, or projects beyond, a plane perpendicular to said surface and cutting the center of the pintle. The notch 10, however, is substantially perpendicular to said surface and preferably slightly curved.

The links are inserted by first sliding the inclined slot or notch over a pintle and then rotating the link until it seats on the pintle at the opposite end, the curve of the notch 10 permitting ready engagement of the notch and pintle upon such rotary movement of the link. To hold each link in place, a pin 12 is dropped in place in the aperture 13 so that the inner end of the pin engages with the pintle. Inward movement of the pin is limited by the wall of the notch and outward displacement is prevented by means of the metal clip 14, preferably in the form of a metal strip which is readily bent, one end 15 being bent downwardly to engage the link and the other end 16 upwardly to engage the pin.

The driver member A may be composed of a plurality of spaced sprockets having any suitable driving connection with the grate.

In Figs. 2 and 3 I have shown a modified form of link in which the ends and the middle portion of the link may be notched or shaped underneath as shown, to permit of driving the grate through the links.

Access to the holding pin 12 of any link may be had when the grate is flexed, as at the driving or driven wheel or sprocket, or, in the construction shown in Figs. 2 and 3, access to the pins may be had from beneath the links, even when the grate is flat, by virtue of the cut-away ends of the links on their under side.

I claim:

1. In a chain grate, the combination of a plurality of pintles, a plurality of links each having a pair of pintle-receiving notches one of which is substantially inclined with respect to the grate surface of the link and the other of which is nearly perpendicular thereto and curved longitudinally, and an aperture extending from the end of the link to said latter notch, and a locking pin for each link inserted in the aperture and extending into the notch between the pintle and the notch opening.

2. In a chain grate, the combination of a plurality of pintles, a plurality of links each having a pair of pintle-receiving notches one of which is substantially inclined with respect to the grate surface of the link and an aperture extending from the end of the link to the other notch, and a locking pin for each link inserted in the aperture and extending into the notch between the pintle and the notch opening, together with a pin-retaining clip comprising a metal strip inserted in the aperture and having its inner end bent to engage the wall of the notch and its outer end bent to engage the outer end of said pin.

3. In a chain grate, the combination of a plurality of pintles, a plurality of links each having a pair of pintle-receiving notches one of which is substantially inclined with respect to the grate surface of the link and an aperture extending from the end of the link to the other notch, and a locking pin for each link inserted in the aperture and extending into the notch between the pintle and the notch opening, each link having also a notch at an end and a notch midway of its ends adapted to engage the grate driving-means the end notch being adapted also to give access to the locking pin.

4. In a chain grate, the combination of a plurality of pintles, a plurality of links each having a pair of pintle-receiving notches one of which is substantially inclined with respect to the grate surface of the link and an aperture extending from the end of the link to the other notch, and a locking pin for each link inserted in the aperture and extending into the notch between the pintle and the notch opening, each link having also a notch at an end and a notch midway of its ends adapted to engage the grate driving-means.

In testimony whereof, I have hereunto signed my name.

JOHN VAN BRUNT.